US012472291B2

(12) United States Patent
Kotanko et al.

(10) Patent No.: US 12,472,291 B2
(45) Date of Patent: Nov. 18, 2025

(54) TECHNIQUES FOR DETERMINING DIALYSIS PATIENT PROFILES

(71) Applicant: Fresenius Medical Care Holdings, Inc., Waltham, MA (US)

(72) Inventors: Peter Kotanko, New York, NY (US); Xia Tao, West New York, NJ (US); Nadja Grobe, Huntington, NY (US); Gabriela Dias, Waltham, MA (US); Zahin Haq, Waltham, MA (US); Stephan Thijssen, New York, NY (US)

(73) Assignee: Fresenius Medical Care Holdings, Inc., Waltham, MA (US)

( * ) Notice: Subject to any disclaimer, the term of this patent is extended or adjusted under 35 U.S.C. 154(b) by 950 days.

(21) Appl. No.: 17/587,168

(22) Filed: Jan. 28, 2022

(65) Prior Publication Data

US 2022/0241476 A1 Aug. 4, 2022

Related U.S. Application Data

(60) Provisional application No. 63/143,110, filed on Jan. 29, 2021.

(51) Int. Cl.
*A61M 1/16* (2006.01)
*A61B 5/00* (2006.01)
(Continued)

(52) U.S. Cl.
CPC ......... *A61M 1/1613* (2014.02); *A61B 5/0059* (2013.01); *A61B 5/0071* (2013.01);
(Continued)

(58) Field of Classification Search
CPC ................ A61B 5/0059; A61B 5/0071; A61B 5/0075; A61B 5/4842; A61M 1/1613;
(Continued)

(56) References Cited

U.S. PATENT DOCUMENTS 5,670,057 A 9/1997 Chen
2011/0009810 A1* 1/2011 Lo .......................... G16H 20/40
604/29

(Continued)

FOREIGN PATENT DOCUMENTS

CN 109562216 A 4/2019
CN 110621360 A 12/2019
(Continued)

OTHER PUBLICATIONS

Eloot, Sunny et al. "Removal of Different Classes of Uremic Toxins in APD vs CAPD: A Randomized Cross-Over Study." Peritoneal dialysis international : journal of the International Society for Peritoneal Dialysis vol. 35,4 (2015): 436-42. doi:10.3747/pdi.2013.00202.

Bortolotti et al., "On the purported "backbone fluorescence" in protein three-dimensional fluorescence spectra" DOI: 10.1039/C6RA23426G (Paper) RSC Adv., 2016, 6, 112870-112876.

(Continued)

*Primary Examiner* — John Kim
(74) *Attorney, Agent, or Firm* — KDW Firm PLLC

(57) ABSTRACT

Methods, apparatuses, and systems for determining patient dialysis profiles, for example, of peritoneal transport status or disease progression, are described. For example, in one embodiment, a method of determining a patient profile of a dialysis patient may include obtaining a volume of fluid associated with the dialysis patient, generating patient information via fluorescence analysis of the patient fluid, and determining the patient profile based on evaluating the patient information with a profile library, the patient profile comprising at least one of a peritoneal transport status classification or a disease progression. Other embodiments are described.

20 Claims, 11 Drawing Sheets

(51) Int. Cl.
*A61M 1/28* (2006.01)
*G16H 10/40* (2018.01)
*G16H 10/60* (2018.01)
*G16H 20/40* (2018.01)
*G16H 50/20* (2018.01)

(52) U.S. Cl.
CPC .......... *A61B 5/0075* (2013.01); *A61B 5/4842* (2013.01); *A61M 1/287* (2013.01); *G16H 10/40* (2018.01); *G16H 10/60* (2018.01); *G16H 20/40* (2018.01); *G16H 50/20* (2018.01); *A61M 2205/505* (2013.01); *A61M 2205/52* (2013.01)

(58) Field of Classification Search
CPC ............ A61M 1/287; A61M 2205/505; A61M 2205/52; G16H 10/40; G16H 10/60; G16H 20/40; G16H 50/20
See application file for complete search history.

(56) References Cited

U.S. PATENT DOCUMENTS

| | | |
|---|---|---|
| 2011/0010101 A1 | 1/2011 | Lo |
| 2017/0016908 A1 | 1/2017 | Lundin et al. |
| 2017/0045455 A1 | 2/2017 | Robertson et al. |

FOREIGN PATENT DOCUMENTS

| | | | |
|---|---|---|---|
| JP | 2012532669 A | | 12/2012 |
| WO | 03063929 A1 | | 8/2003 |
| WO | WO 2006/002483 A1 | * | 1/2006 |

OTHER PUBLICATIONS

Wiesenhofer et al., "Targeted Metabolomic Profiling of Peritoneal Dialysis Effluents Shows Anti-oxidative Capacity of Alanyl-Glutamine" Front. Physiol., Jan. 21, 2019 | https://doi.org/10.3389/fphys.2018.01961.
Csaicsich, Dagmar et al. "Feasibility of Metabolomics Analysis of Dialysate Effluents from Patients Undergoing Peritoneal Equilibration Testing." Peritoneal dialysis international : journal of the International Society for Peritoneal Dialysis vol. 35,5 (2015): 590-2. doi:10.3747/pdi.2014.00118.
Sritippayawan et al, Proteomic analysis of peritoneal dialysate fluid in patients with different types of peritoneal membranes, Oct. 9, 2007, Journal of Proteome Research, vol. 6, pp. 4356-4362 (Year: 2007), 5 pages.
Asano et al. Clin. And Experi. Nephro. 23(1): 122-143 (2018).
Tyan et al. Clin. Chimica Acta 420:34-44 (2012).
International Search Report and Written Opinion for International Application No. PCT/US2021/015696, mailed on May 18, 2021, 13 pages.
International Search Report and Written Opinion for International Application No. PCT/US2022/014233 mailed on May 11, 2022, 11 pages.
Wen Qiong et al. Biochem. and Biophys. Res. Comm, Elsevier, vol. 438, No. 3, 2013.
Salim Mujais et al., "Profiling of peritoneal ultrafiltration," Kidney International, Elsevier, vol. 62, Supplement 81, 2002, pp. S17-S22.
Asano et al., "Differences in peritoneal solute transport rates in peritoneal dialysis," Clinical and Experimental Nephrology, Japanese Society of Nephrology, Tokyo, JP, vol. 23, Jul. 2, 2018, pp. 122-134.

\* cited by examiner

TECHNIQUES FOR DETERMINING DIALYSIS PATIENT PROFILES

CROSS-REFERENCE TO RELATED APPLICATION

This application claims the benefit of priority of 35 U.S.C. § 119(e) to U.S. Provisional Patent Application Ser. No. 63/143,110, filed on Jan. 29, 2021, the contents of which are incorporated by reference in their entirety as if fully set forth herein.

FIELD

The disclosure generally relates to determining physical characteristics of dialysis patients, and, more particularly, to processes for determining patient dialysis profile information indicative of the health of the patient and/or the success of dialysis for the patient.

BACKGROUND

Analysis of dialysis patient fluids are routinely performed by healthcare providers to determine treatment effectiveness and monitor patient health. For example, for hemodialysis (HD) patients, compounds such as urea, uremic toxins, creatinine, phosphate, and/or nutrients may be examined to manage HD prescriptions. Patient treatment success in peritoneal dialysis (PD) is dependent on the functional and morphological integrity of the peritoneal membrane, including peritoneal transport status (i.e., transport across the peritoneal membrane for various solutes). In addition to functional failure of the peritoneum, long-term PD may lead to anatomical changes in the peritoneal tissues such as neoangiogenesis, vasculopathy, and fibrosis, sometimes causing peritoneal sclerosis. Accordingly, various patient characteristics are typically monitored during the course of PD and HD treatment.

Conventional methods for determining compounds of interest for HD patients or peritoneal transport status for PD patients (and/or other dialysis patient characteristics) are labor-intensive, time-consuming, and require extra patient clinic visits outside of regular dialysis treatment. Accordingly, dialysis patients and healthcare providers would benefit from processes capable of efficiently and effectively determining patient characteristics that may affect dialysis treatment without the drawbacks of conventional methods.

SUMMARY

This Summary is provided to introduce a selection of concepts in a simplified form that are further described below in the Detailed Description. This Summary is not intended to necessarily identify key features or essential features of the claimed subject matter, nor is it intended as an aid in determining the scope of the claimed subject matter.

In one embodiments, a method of determining a patient profile of a dialysis patient may include obtaining a volume of fluid associated with the dialysis patient, generating patient information via fluorescence analysis of the patient fluid, and determining the patient profile based on evaluating the patient information with a profile library, the patient profile comprising at least one of a peritoneal transport status classification or a disease progression.

In some embodiments of the method, the volume may be obtained during routine dialysis of a patient. In various embodiments of the method, the fluorescence analysis may include fluorescence spectroscopy. In some embodiments of the method, the fluorescence analysis may be performed via an in-line fluorescence device.

In various embodiments of the method, the fluid may include fresh dialysate of a peritoneal various (PD) treatment. In exemplary embodiments of the method, the fluid may include PD effluent of a PD treatment.

In some embodiments of the method, the patient information generated based on a fluorescent plot. In various embodiments of the method, the profile library may include peritoneal equilibration test (PET) information.

In some embodiments, the method may include generating the patient profile via a machine learning computational model configured to provide the patient profile as output based on the patient information as input.

In various embodiments, the method may include training a computational model using at least a portion of the profile library to generate patient profile output based on patient information input. In exemplary embodiments, the method may include training a computational model using a profile library comprising PET information and associated fluorescent plots of known health conditions of a population of patients.

In some embodiments, the method may include determining a dialysis prescription based on the patient profile. In various embodiments, the method may include performing a dialysis treatment on the patient based on the patient profile.

In one embodiments, an apparatus may include processor circuitry and a memory coupled to the processor circuitry. The memory may include instructions that, when executed by the processor circuitry, cause the processor circuitry to generate patient information via fluorescence analysis of a patient fluid, determine the patient profile based on evaluating the patient information with a profile library, the patient profile comprising at least one of a peritoneal transport status classification or a disease progression, wherein the patient profile is generated via a machine learning computational model configured to provide the patient profile as output based on the patient information as input.

In some embodiments of the apparatus, the fluorescence analysis may include fluorescence spectroscopy. In some embodiments of the apparatus, the fluorescence analysis performed via an in-line fluorescence device.

In some embodiments of the apparatus, the fluid may include PD effluent of a PD treatment. In some embodiments of the apparatus, the patient information may be generated based on a fluorescent plot. In some embodiments of the apparatus, the profile library may include peritoneal equilibration test (PET) information.

In some embodiments of the apparatus, the instructions, when executed by the processor circuitry, may cause the processor circuitry to train a computational model using a profile library comprising PET information and associated fluorescent plots of known health conditions of a population of patients.

BRIEF DESCRIPTION OF THE DRAWINGS

By way of example, specific embodiments of the disclosed machine will now be described, with reference to the accompanying drawings, in which.

DETAILED DESCRIPTION

Figure 1:
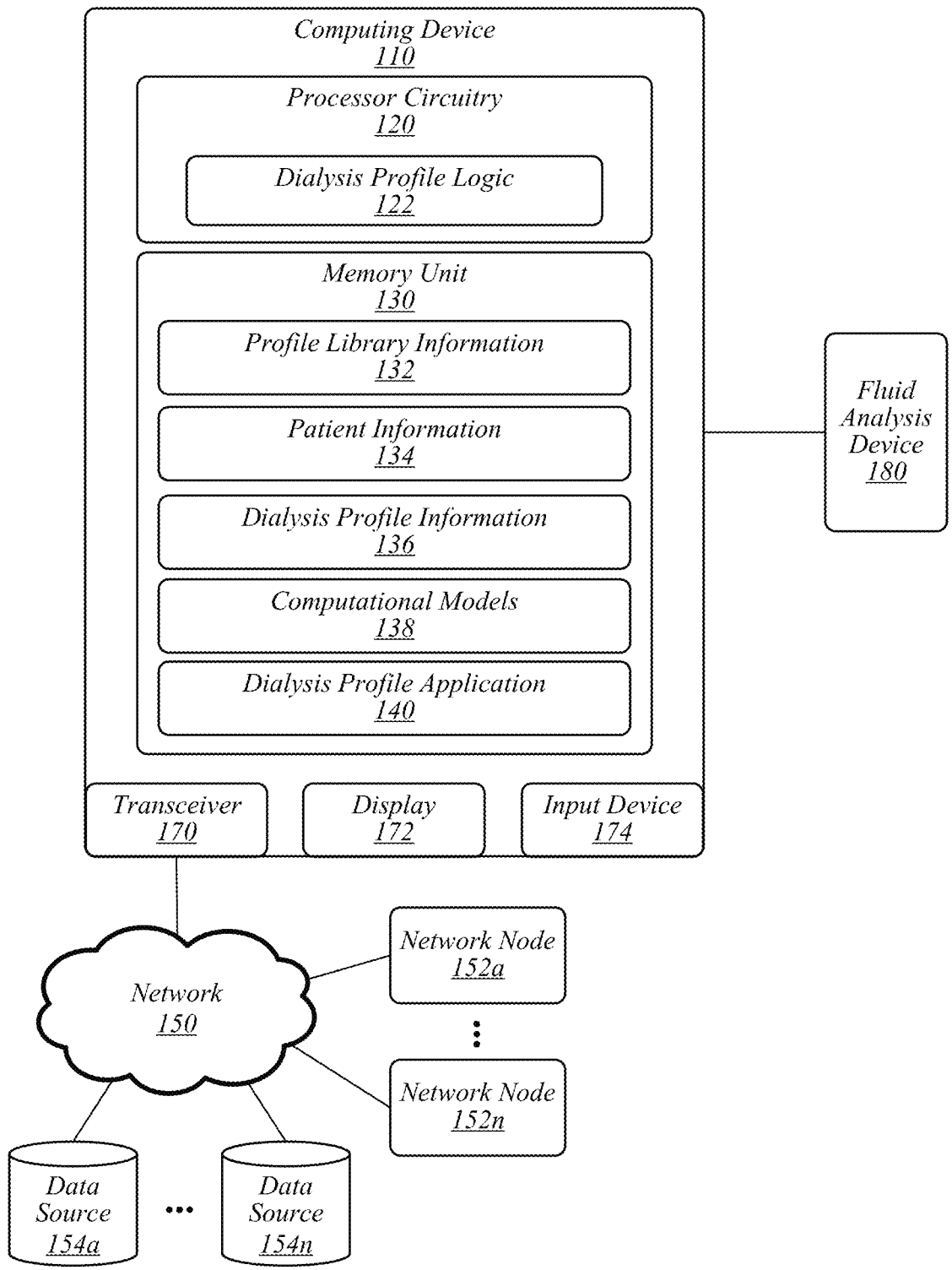
FIG. 1 illustrates a first exemplary operating environment according to some embodiments.

The present embodiments will now be described more fully hereinafter with reference to the accompanying drawings, in which several exemplary embodiments are shown. The subject matter of the present disclosure, however, may be embodied in many different forms and should not be construed as limited to the embodiments set forth herein. Rather, these embodiments are provided so that this disclosure will be thorough and complete, and willfully convey the scope of the subject matter to those skilled in the art. In the drawings, like numbers refer to like elements throughout.

Patient treatment success in peritoneal dialysis (PD) is dependent on the functional and morphological integrity of the peritoneal membrane. In addition to functional failure of the peritoneum, long-term PD may lead to anatomical changes in the peritoneal tissues such as neoangiogenesis, vasculopathy and fibrosis, sometimes causing peritoneal sclerosis. Membrane characteristics may be altered over the course of PD treatment, particularly after sustained use of non-physiological dialysis fluids. Accordingly, patient characteristics may be monitored over the duration of a PD patient treatment regimen to ensure, among other things, the health of patient peritoneal anatomy and/or the effectiveness of PD treatment. Non-limiting patient characteristics may include peritoneal transport status, dialysis adequacy, membrane characteristics, unexplained clinical changes, ultrafiltration failure, and/or the like.

For PD patients, a primary monitored characteristic may include peritoneal transport status. In general, peritoneal transport status is a classification of membrane function by measuring the rate at which solutes equilibrate between the dialysate and body plasma. For example, the dialysate-to-plasma (D/P) ratio may operate to measure the combined effect of diffusion and ultrafiltration during PD. A low solute D/P may indicate that transport across the peritoneal membrane for a given solute occurs slowly and/or equilibrium between the dialysate and plasma is reached gradually. In contrast, a high solute D/P may indicate that transport of a solute across the membrane occurs quickly and/or equilibrium is reached sooner. D/P ratios are typically assessed for various solutes including, without limitation, urea, creatinine, and sodium.

Conventional tests for monitoring peritoneal transport status are generally time consuming, difficult for patients, and lack analysis of the full array of elements (for instance, metabolites) that may be used to form a complete assessment. For example, the standard peritoneal equilibration test (PET) is a 4-hour test developed over 30 years ago to assess peritoneal transport status in patients undergoing PD. The standard PET requires the collection of approximately 10 ml peritoneal effluent samples at certain time intervals and a mid-point blood sample (typically collected at a healthcare facility). The solute transport rates are assessed by the rates of their equilibration between the peritoneal capillary blood and dialysate. As a proxy for all solutes, urea, creatinine, glucose, and sometimes sodium, are measured in the collected samples using different analytical tests. Patients may then be diagnosed or categorized, for example, as high, high-average, low-average, or low transporters based on their solute transport characteristics.

As the PET is very labor-intensive and the time spent in the clinic by the patient to complete the standard PET is long and requires many lab samplings, a mini PET has been developed for follow-ups in response to clinical change. However, this modified version of the PET has shown inconsistencies compared to the standard PET. For both the standard PET and the mini PET, errors are possible due to sampling, data entry, calculations, and lab measurements. Another drawback is that the lab measurements for certain compounds may be affected by patient conditions that have to be corrected or otherwise managed. For example, creatinine may be incorrect due to high glucose concentrations and a correction factor is required for calculating the true creatinine amount. However, managing such correction factors is an inefficient and error-prone process.

Although PD is used in examples in the present disclosure, embodiments are not so limited, as the described embodiments may be used to monitor fluid composition of other types of patients, including hemodialysis (HD) patients and HD effectiveness. For example, the effectiveness of HD (or the progression of chronic kidney disease (CKD) or end-stage renal disease (ESRD) in HD patients) may be assessed via analysis of various compounds or markers, including, without limitation, creatinine, albumin, cystatin C, glomerular filtration rate (GFR), and/or the like. However, conventional tests of HD effectiveness (or CKD or ESRD progression) are time consuming and require additional patient visits, in addition, available marker tests are typically not sensitive enough to detect changes in the early stages of kidney disease.

Accordingly, some embodiments may provide a dialysis profile process operative to determine patient profiles that may include kidney disease markers and/or a peritoneal transport status markers in a manner that is more efficient, effective, accurate, and/or repeatable than conventional methods, including PET, mini-PET, and/or the like. In some embodiments, the dialysis profile process may analyze patient samples using fluorescence analysis techniques. Non-limiting examples of fluorescence analysis techniques may include fluorescence spectrometry, fluorescence spectroscopy, fluorescence spectrophotometry, and/or the like. In various embodiments, the patient samples may include fluid samples of the patient or associated with dialysis of the patient. Non-limiting examples of patient samples may include blood, PD fluid, PD effluent, In various embodiments, portable, micro, in-home or in-facility (for instance, an outpatient facility, dialysis facility, medical office, and/or the like), personal, and/or the like fluorescence analysis devices may be used by patients and/or patient caregivers to monitor patient and/or dialysis fluids. The fluorescence analysis devices may be used at point-of-care locations to provide on-site analysis of patient and/or dialysis fluids. The composition of patient fluids (for instance, spent dialysate), such as albumin, peptides, white blood cells, red blood cells, bacteria, advanced glycation end products, and/or many other biological molecules could intrinsically emit fluorescent signals when excited. Using dialysis profile processes according to some embodiments, the composition of spent dialysate (or other patient and/or dialysis fluids) could be used to determine the composition or change of biomarkers in patient circulation as well as locally, for instance, in the peritoneal cavity.

Dialysis profile processes according to some embodiments may provide multiple technological advantages and improvements to technology over conventional systems. In a non-limiting technological advantage, a dialysis profile process according to some embodiments may provide a more practical and personalized tool to evaluate dialysis adequacy, renal disease status or progression, peritoneal membrane characteristics, unexplained clinical changes, ultrafiltration failure, and/or the like. In a non-limiting technological advantage, a dialysis profile process according to some embodiments may use PD effluent or HD patient fluids that are collected from patients while at a clinic for routine checkups, at the patient's home, and/or the like; accordingly, no extra visits, such as are needed for PET, are required. In addition, the patient and healthcare team do not need to undergo a lengthy (for instance, a four-hour protocol) process. Instead, dialysis profile processes according to some embodiments may use PD effluent or HD patient fluids that may be routinely collected at scheduled monthly or quarterly visits. In various embodiments, PD effluent or HD patient fluids may be tested using stand-alone devices in the patient home or healthcare facility. In some embodiments, a vast array of molecules (i.e., hundreds of molecules or greater), including, without limitation, urea, creatinine, albumin, and glucose, may be analyzed in less than 1 ml of PD effluent using a spectrum analysis, such as a fluorescence spectrum analysis. In various embodiments, a dialysis profile process may provide a personalized metabolomics-based transport test for PD and/or HD.

Accordingly, dialysis profile processes according to some embodiments may minimize the impact and intrusion of therapy on patients by reducing the number of extra visits to the clinic to determine transport status, disease progression, and/or the like and providing accurate measurements of physical characteristics important for patient health and dialysis effectiveness. As a result, reduced disease maintenance and interventions may lower the risk of infection, which is the second leading cause of death in dialysis patients, and other complications. Accordingly, dialysis profile processes according to some embodiments may operate to improve patient quality of life. Other technological advantages are described. Embodiments are not limited in this context.

FIG. 1 illustrates an example of an operating environment 100 that may be representative of some embodiments. As shown in FIG. 1, operating environment may include a computing device 110. In various embodiments, the functions, operations, configurations, data storage functions, applications, logic, and/or the like described with respect to computing device 110 may be performed by and/or stored in one or more other computing devices (not shown), for example, coupled to computing device 110 via a network 150 (for example, network nodes 152a-n). A single computing device 110 is depicted for illustrative purposes only to simplify the figure. For example, operating environment 100 may include a plurality of computing devices 110 configured independently or in combination to perform aspects of embodiments described herein. Embodiments are not limited in this context.

Computing device 110 may include a transceiver 170, a display 172, an input device 174, and/or processor circuitry 120 that may be communicatively coupled to a memory unit 130. Processor circuitry 120 may be, may include, and/or may access various logics for performing processes according to some embodiments. For instance, processor circuitry 120 may include and/or may access a dialysis profile logic 122. Processing circuitry 120 and/or dialysis profile logic 122 and/or portions thereof, may be implemented in hardware, software, or a combination thereof. As used in this application, the terms "logic," "component," "layer," "system," "circuitry," "decoder," "encoder," "control loop," and/or "module" are intended to refer to a computer-related entity, either hardware, a combination of hardware and software, software, or software in execution, examples of which are provided by the exemplary computing architecture 700. For example, a logic, circuitry, or a module may be and/or may include, but are not limited to, a process running on a processor, a processor, a hard disk drive, multiple storage drives (of optical and/or magnetic storage medium), an object, an executable, a thread of execution, a program, a computer, hardware circuitry, integrated circuits, application specific integrated circuits (ASIC), programmable logic devices (PLD), digital signal processors (DSP), field programmable gate array (FPGA), a system-on-a-chip (SoC), memory units, logic gates, registers, semiconductor device, chips, microchips, chip sets, software components, programs, applications, firmware, software modules, computer code, a control loop, a proportional-integral-derivative (PID) controller, combinations of any of the foregoing, and/or the like.

Although dialysis profile logic 122 is depicted in FIG. 1 as being within processor circuitry 120, embodiments are not so limited. For example, dialysis profile logic 122 and/or any component thereof, may be located within an accelerator, a processor core, an interface, an individual processor die, implemented entirely as a software application (for instance, a dialysis profile application 140) and/or the like.

Memory unit 130 may include various types of computer-readable storage media and/or systems in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In addition, memory unit 130 may include various types of computer-readable storage media in the form of one or more lower speed memory units, including an internal (or external) hard disk drive (HDD), a magnetic floppy disk drive (FDD), and an optical disk drive to read from or write to a removable optical disk (e.g., a CD-ROM or DVD), a solid state drive (SSD), and/or the like.

Memory unit 130 may store profile library information 132, patient profile information 134, and/or patient information 134. In some embodiments, profile library information 132 may include information (or "fingerprints") used as a baseline to determine individual patient profiles. In various embodiments, patient profiles may include peritoneal transport status, dialysis adequacy, membrane characteristics, unexplained clinical changes, ultrafiltration failure information, renal disease state or progression information (for instance, a fingerprint or snapshot of patient metabolic profiles), and/or classifications thereof. For example, a patient profile may include a classification of peritoneal transport status, such as the following categories: high, high-average, average, low-average, or low transporters. Embodiments are not limited to these categories, as patient profiles and/or peritoneal transport status may be categorized using various systems, such as a numeric category, grading (i.e., A-F), symbols, and/or the like. In some embodiments, patient profiles and information associated therewith (i.e., peritoneal transport status, metabolic fingerprints or snapshots, and/or the like) may be stored as patient profile information 132.

In various embodiments, profile library information 132 may include fluorescence analysis information of patients with known patient profiles. For example, profile library information 132 may include fluorescence data and/or other diagnostic data (for instance, PET, MS, and/or the like) of metabolites of patients with a known status, such as a known peritoneal transport status, disease state, disease progression, dialysis effectiveness, health condition, and/or the like. For example, profile library information 132 may provide data-based relationships between certain patient outcomes (e.g., statuses) and measured compounds. In various embodiments, the profile library information 132 may include fingerprints, libraries, and/or the like generated from a population of patients so that, for example, patient information may be compared with the same or similar populations of patients (for instance, based on age, gender, disease progression, and/or the like) to determine a patient profile.

In some embodiments, patient information 134 may include information obtained about a patient via analysis of a patient sample, for example, such as blood or PD effluent. For example, in some embodiments, patient information may include spectrometer data generated via analysis of patient fluids using a spectrometer, including a portable spectrometer, micro-spectrometer, point-of-care spectrometer, and/or the like.

In some embodiments, the volume of patient fluid, such as PD effluent, required to generate patient information 134 may be about 1 milliliter (ml) or less. In various embodiments, the volume of PD effluent may be about 0.001 ml, about 0.005 ml, about 0.01 ml, about 0.05 ml, about 0.1 ml, about 0.2 ml, about 0.3 ml, about 0.4 ml, about 0.5 ml, about 1.0 ml, about 1.5 ml, and/or any value or range between any two of these values (including endpoints).

In exemplary embodiments, profile library information 132, patient profile information 134, and/or patient information may be obtained from a remote data source, such as data store 154a-n and/or via network node 152a-n.

In some embodiments, a fluid analysis device 180 may be used to analyze a patient fluids and/or fluid associated with the patient. In some embodiments, fluid analysis device may be or may include a portable, micro, in-home or in-facility (for instance, an outpatient facility, dialysis facility, medical office, and/or the like), personal, and/or the like fluorescence analysis devices (see, for example, FIG. 3) may be used by patients and/or patient caregivers to monitor patient and/or dialysis fluids. In exemplary embodiments, fluid analysis device 180 may be integrated into or may be communicatively coupled to computing device 110. In various embodiments, data generated by fluid analysis device 180 may be stored as dialysis profile information 136.

In some embodiments, computational models 138 may include one or more artificial intelligence (AI) models, machine learning (ML) models, deep learning (DL) models, a neural network (NN) (such as an artificial NN (ANN), a convolutional NN (CNN), a recurrent NN (RNN), and/or the like), an expert system, an inference engine, a decision tree, a random forest algorithm, a knowledge base, variations thereof, combinations thereof, and/or the like. Embodiments are not limited in this context.

In some embodiments, dialysis profile logic 122, for example, alone or via dialysis profile application 140, may determine a patient profile for a patient based on patient information 134 and profile library information 132. For example, dialysis profile logic 122 may receive patient information 134 in the form of spectrometer analysis results of a volume of PD effluent from the patient. Dialysis profile logic 122 may compare the analysis results to corresponding profile library information 132 to determine a matching profile. For example, the MS analysis results for Patient A may match with a high peritoneal transport status.

Dialysis profile logic 122 may operate to perform a training process to train a computational model 138 using training data, which may include, without limitation historical or past fluorescence spectrum, patient diagnoses, patient metabolic profiles, PET information, and/or any other type of information that may be used by computational models 138. Computational models 138 may be trained to generate diagnosis output, for example, peritoneal transport status, (kidney) disease progression, (kidney) disease state, and/or the like based on fluorescence spectrum input. For example, a computational model 138 may be trained on a training database of (2D) fluorescence spectrum of samples with known transporters status classified by the conventional methods such as PET test. Embodiments are not limited in this context.

In some embodiment, fluorescence spectrums of patient fluids, such as PD effluent, may be used to determine patient information, including a metabolic profile, transport status, and/or the like. Some embodiments may include fluid analysis devices, such as fluorescent spectrometers, that may be used in home environment by patients. Accordingly, embodiments may be or may include stand-alone instruments or devices configured for attachment to dialysis equipment, such as PD extension tubes. In cases where occasional checkup is needed, patients can sample fresh dialysate and their PD effluent after treatment to a designated cassette, cuvette, or other container that can be inserted into a fluid analysis device (e.g., fluorescent spectrometer) for analysis.

In cases where continuous monitoring is desired, a portable device for sampling and detection may be attached to PD extension tube when fresh dialysate is infused into peritoneal cavity. For CAPD users, embodiments could be detached during dwell and attached again before draining starts; for CCPD users, embodiments could remain attached during dwell. Devices may operate during dialysate infusion and draining cycles, so that spectrum of fresh PD dialysate and spent dialysate may be captured.

Figure 2:
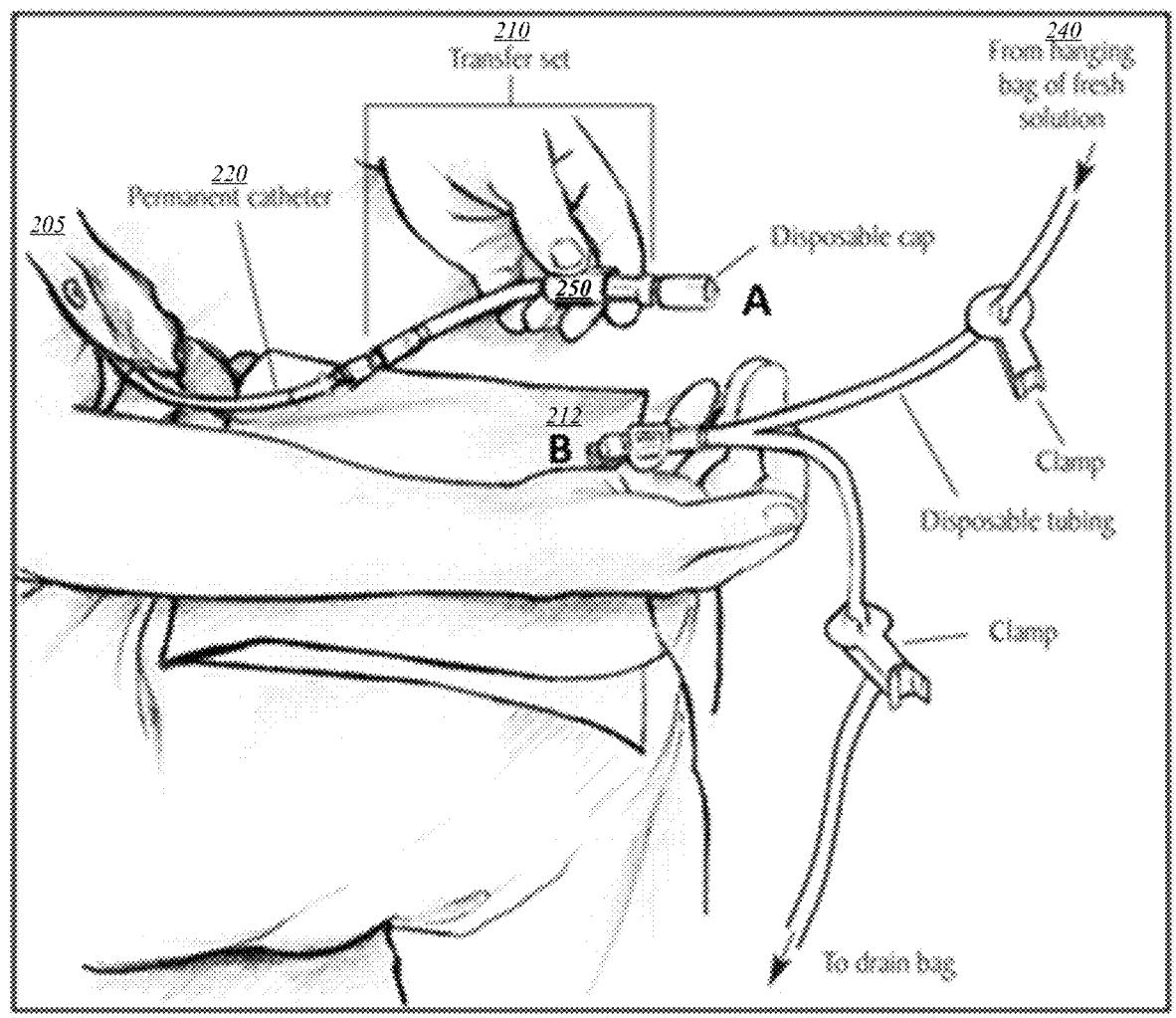
FIG. 2 depicts an illustrative dialysis configuration according to some embodiments.

FIG. 2 depicts a PD configuration according to some embodiments. As shown in FIG. 2, a PD configuration 200 (e.g., a continuous ambulatory PD (CAPD) configuration) may include various tubing, conduits, connectors, and other elements to facilitate the proper flow of dialysate into patient 205 in a filling stage and out of patient 205 in a draining stage. Patient 205 may have a permanent catheter 220 in fluid communication with their peritoneal cavity. During CAPD, when patient 205 is ready to drain PD fluid after a dwell, a collection device 250 may be attached to their transfer tubing set (A) 210 (for instance, at an inlet end). Drain bag tubing set (B) 212 may be fluidically connected to collection device 250 on the other end (for instance, an outlet end). Patient 205 may start draining the PD effluent from their peritoneal cavity. The PD effluent and/or materials in the PD effluent may be collected by collection device 250.

In some embodiments, fluid collected by collection device 250 may be provided to a fluid analysis device. In various embodiments, a fluid analysis device may be fluidically coupled to collection device 250 so that the collected fluid may be analyzed in-place.

Figure 3:
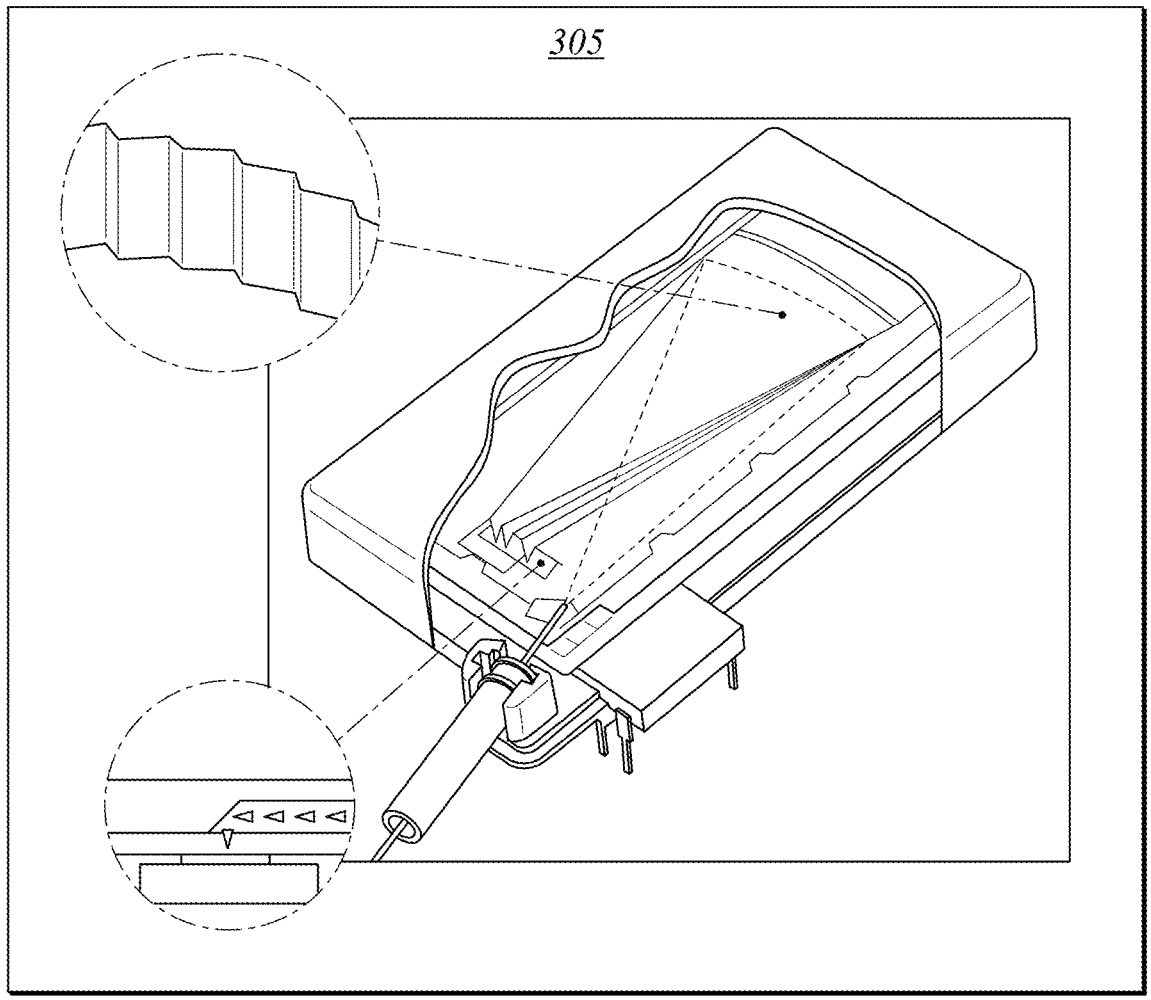
FIG. 3 illustrates an exemplary spectral sensor in accordance with the present disclosure.

FIG. 3 depicts an illustrative fluid analysis device in accordance with features of the present disclosure. Fluid analysis device 305 may include a spectrometer device, such as a micro-spectrometer. In various embodiments, fluid analysis device 305 may include a micro-optic device and/or spectral sensor integrated into a device, such as a computing or logic device. A non-limiting example of a fluid analysis device may include a micro-spectrometer provided by Insion GmbH of Heilbronn, Germany. In exemplary embodiments, a fluid analysis device 305 may be or may include a fluorescence analysis device that is portable, micro, in-home or in-facility (for instance, an outpatient facility, dialysis facility, medical office, and/or the like), personal, and/or the like that may be used by patients and/or patient caregivers to monitor patient and/or dialysis fluids, including in real-time or substantially in real-time.

Figure 4:
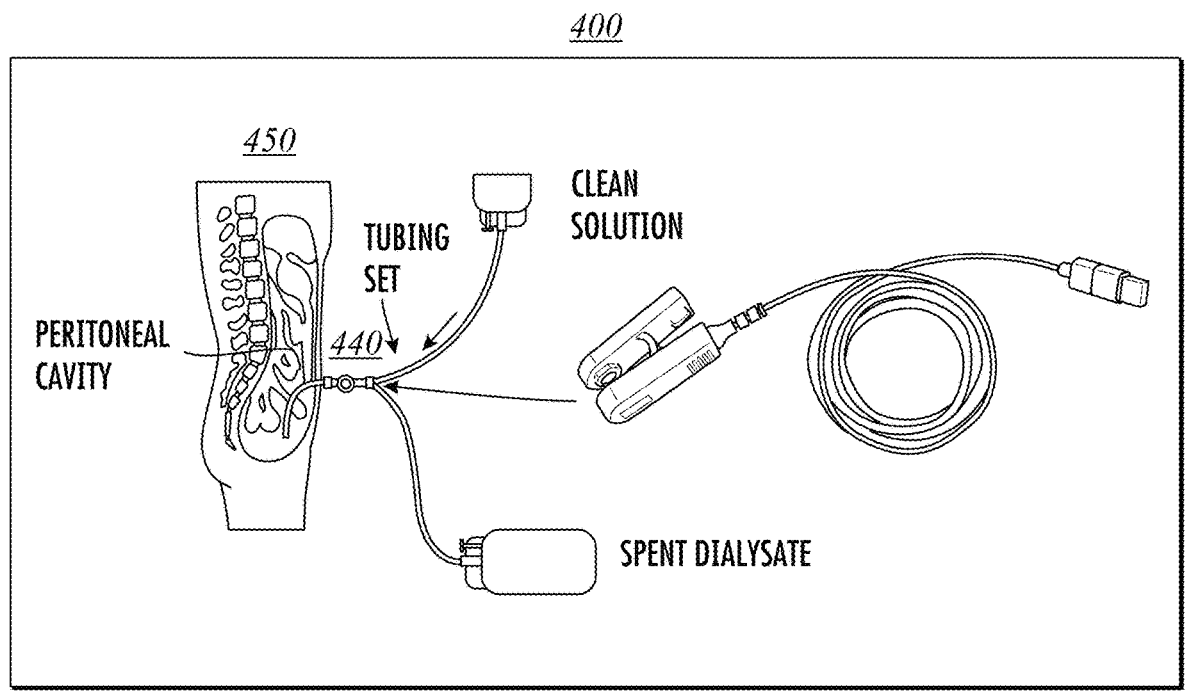
FIG. 4 illustrates a second exemplary operating environment according to some embodiments.

FIG. 4 illustrates a second exemplary operating environment according to some embodiments. As shown in FIG. 4, an operating environment 400 for sampling and testing patient fluids during a PD treatment of a patient 450 may include an in-line analysis device (e.g., in-line with the flow of dialysate, patient fluids, and/or the like). A modified fluid management device 440 (for instance, a CliC device available from Fresenius Medical Care, Waltham, Massachusetts, United States of America) with capabilities to collect fluorescence spectrum may be used as a detection device.

Although specific patient sample collection and analysis configurations have been used as examples, for instance, in FIGS. 3 and 4, embodiments are not so limited as any type of sample collection and analysis configuration that may operate according to some embodiments is contemplated in the present disclosure.

Figure 5:
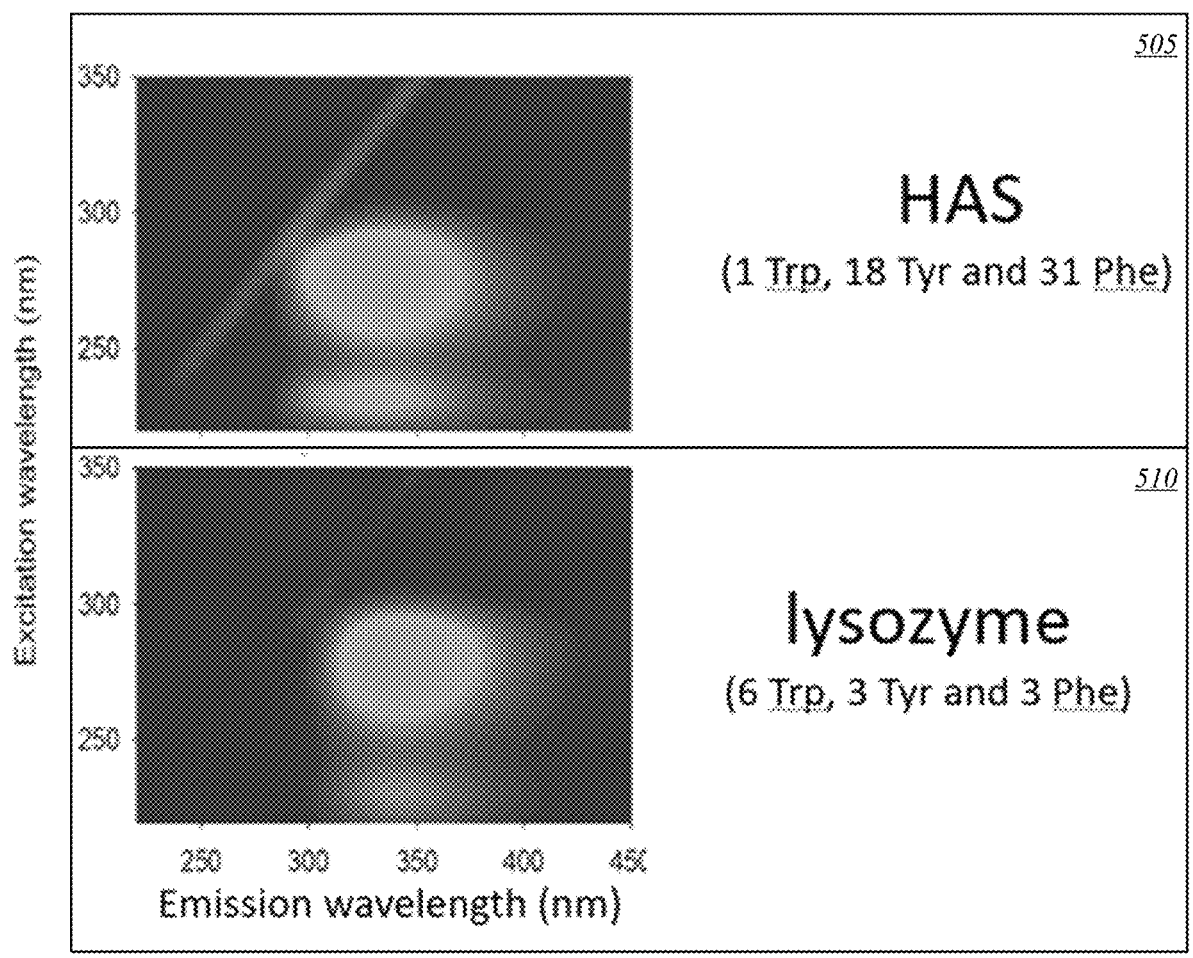
FIG. 5 depicts exemplary 2D fluorescence spectra in accordance with the present disclosure.

A dialysis profile process may perform data acquisition and analysis according to various processes. For example, two-dimensional (2D) fluorescence measurements where the excitation wavelength may be systematically scanned, for example, while the corresponding emission spectra may be collected. This method generates may generate a 2D correlation map enabling identification of multiple fluorophores in the mixture, their interactions, and the time-dependent evolution. The 2D spectra may be used for investigations of different compounds, such as proteins in a solution. For example, FIG. 5 depicts fluorescence spectrum of human serum albumin 505 and lysozyme 510 (adopted from Bortolotti et al., 2016, 6, 112870, which is incorporated by reference as if fully set forth in the present disclosure).

Different amino acid sequences can produce different spectrum on a 2D contour plot. Different colors may indicate relative signal intensity. The dialysis profile process uses portable technology and can be used in a point-of-care environments.

The composition of spent dialysate, such as albumin, peptides, white blood cells, red blood cells, bacteria, advanced glycation end products and many other biological molecules may emit fluorescent signals when excited. Accordingly, the composition of spent dialysate may be used via fluorescent analysis (e.g., fluorescence spectroscopy) to provide analysis of patient biomarkers, for example, to inform clinicians of change of biomarkers in patient's circulation as well as locally in the peritoneal cavity.

Traditionally, single, or multiple excitation/emission wavelengths were selected to measure targeted molecules in the biological samples. For example, excitation $\lambda$:280 nm; emission $\lambda$:340 nm was used to measure uremic solutes, indoxyl sulfate, and $\lambda ex$:265 nm; $\lambda em$:290 nm for p-cresol sulfate. This approach is useful when the relationship between certain patient outcomes and analyst measurements is established. In current clinical experience, only few causality links were established between solutes and clinical manifestations. Most of the time, the relationship between clinical outcomes, for example, of uremic solutes is believed to be due to multifactorial interactions. Therefore, an untargeted approach of a dialysis profile process according to some embodiments, which can measure multiple known and unknown substances in the spent dialysate, may provide an analysis of patient health and/or dialysis efficiency that is not available with a solely targeted approach, especially when blood levels of solutes are not obtained.

Figure 6:
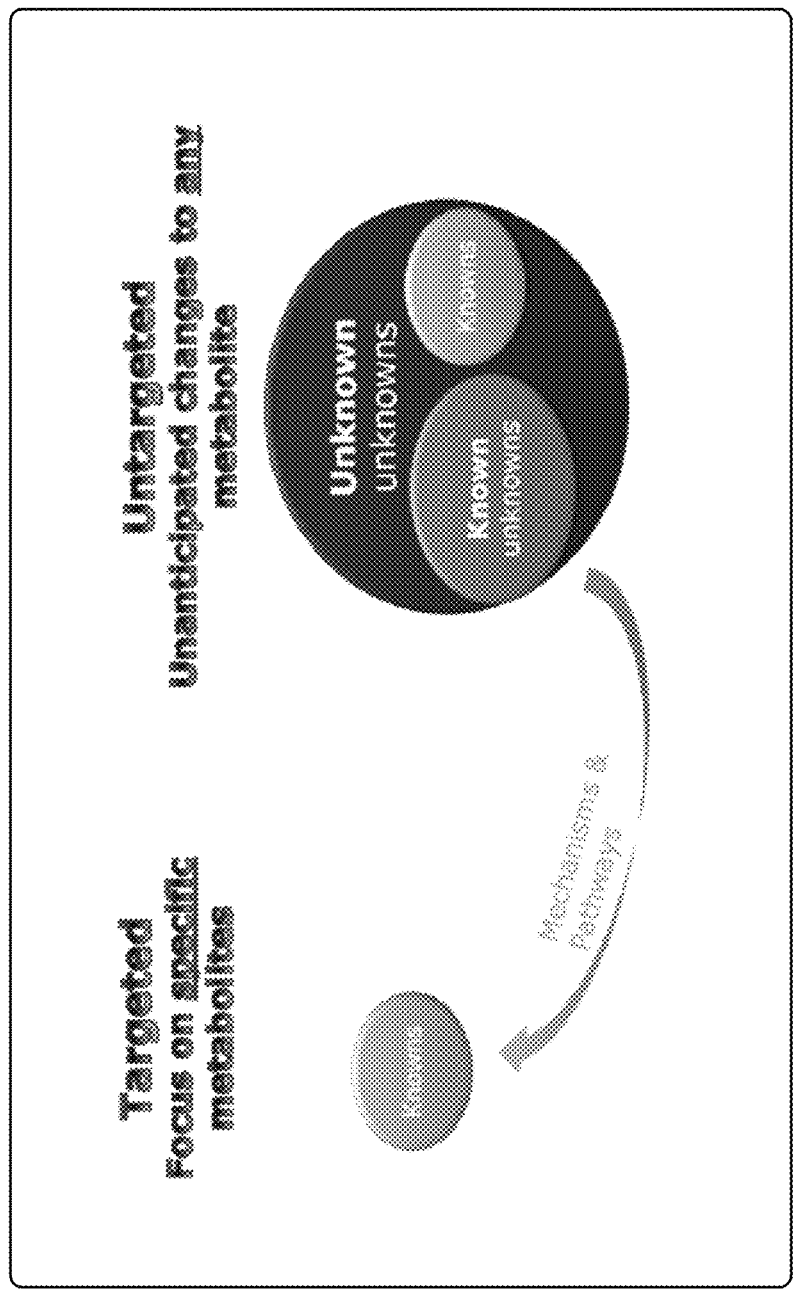
FIG. 6 illustrates targeted and untargeted approaches to a PD profile process according to some embodiments.

FIG. 6 depicts an approach for dialysis profiling processes according to some embodiments. Traditionally, hypothesis-driven approaches have been used to categorize transport status targeting known solutes, such as urea, creatinine, and glucose. In an untargeted approach all molecules, including previously unknowns presented in PD effluent, may be used to generate and/or evaluate patient profile information, such as dialysis adequacy, transport characteristics, and/or the like.

In some embodiments, dialysis profile processes may be combined with machine learning (ML) techniques, including, without limitation, artificial intelligence (AI) processes, neural networks (NN), and/or the like. For example, dialysis profile processes, patient information, profile information, library information, fingerprints, and/or the like may be used in ML/AI applications to analyze, predict, or otherwise patient profiles (e.g., peritoneal transport status and/or classification thereof) and/or to determine a recommended treatment or other course of action based on a patient profile. In various embodiments, library information may be or may include patient profile computational models (e.g., ML processes, AI processes, neural networks (NNs), convoluted neural networks (CNNs), and/or the like. In some embodiments, for example. ML/AI processes may correlate the specific molecular patterns with peritoneal transport status.

For example, in some embodiments, ML/AI algorithms, processes, and/or the like may be used to learn the optimal parameters of the predictive model by investigating past examples with known inputs and known outputs. After training, the predictive model can be used to make predictions on unseen inputs (i.e., generalization). For example, dialysis profile processes may involve a classification supervised learning problem in which the output belongs to a set of distinct classes (e.g., transporter type of a PD patient, disease state of an HD patient, and/or the like). Non-limiting types of ML algorithms for building predictive models according to some embodiments may include, without limitation, logistic regression, tree-based methods, Random Forest methods, Gradient Boosting methods, deep learning (DL) algorithms such as Recurrent Neural Networks (RNNs), which process sequence of input, and/or the like. Embodiments are not limited in this context.

Patients with different health or dialysis characteristics may have different 2D fluorescence plot. For example, patients with different transport status of solutes into their peritoneal cavity or patients with a different kidney disease progression may have different 2D fluorescence plot.

Results on the fluorescence spectrum can be analyzed by, among other techniques, ML and/or AI techniques to classify the transporter status.

Figure 7:
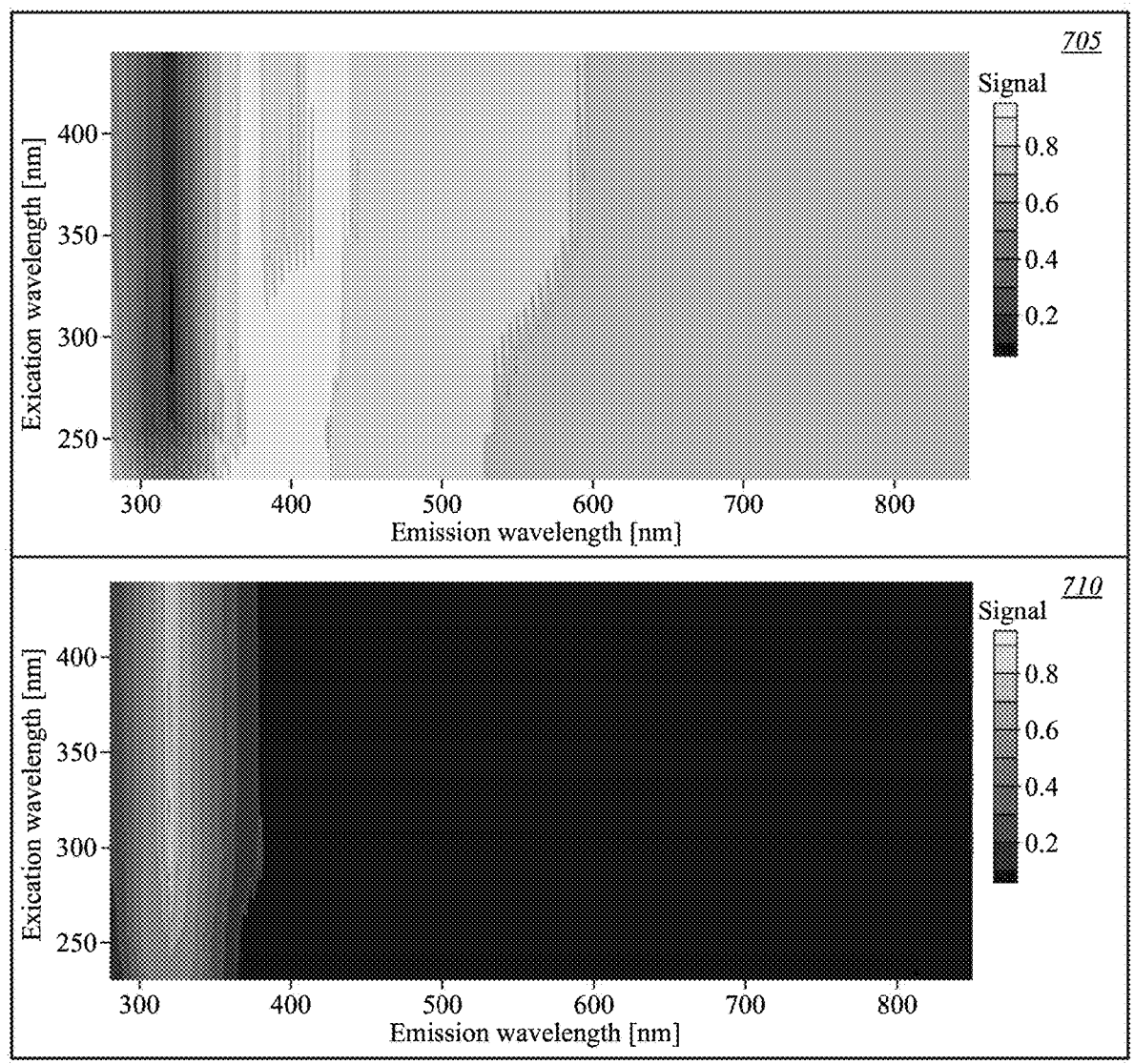
FIGS. 7 and 8 depict exemplary 2D fluorescence spectrum of in accordance with the present disclosure.
Figure 8:
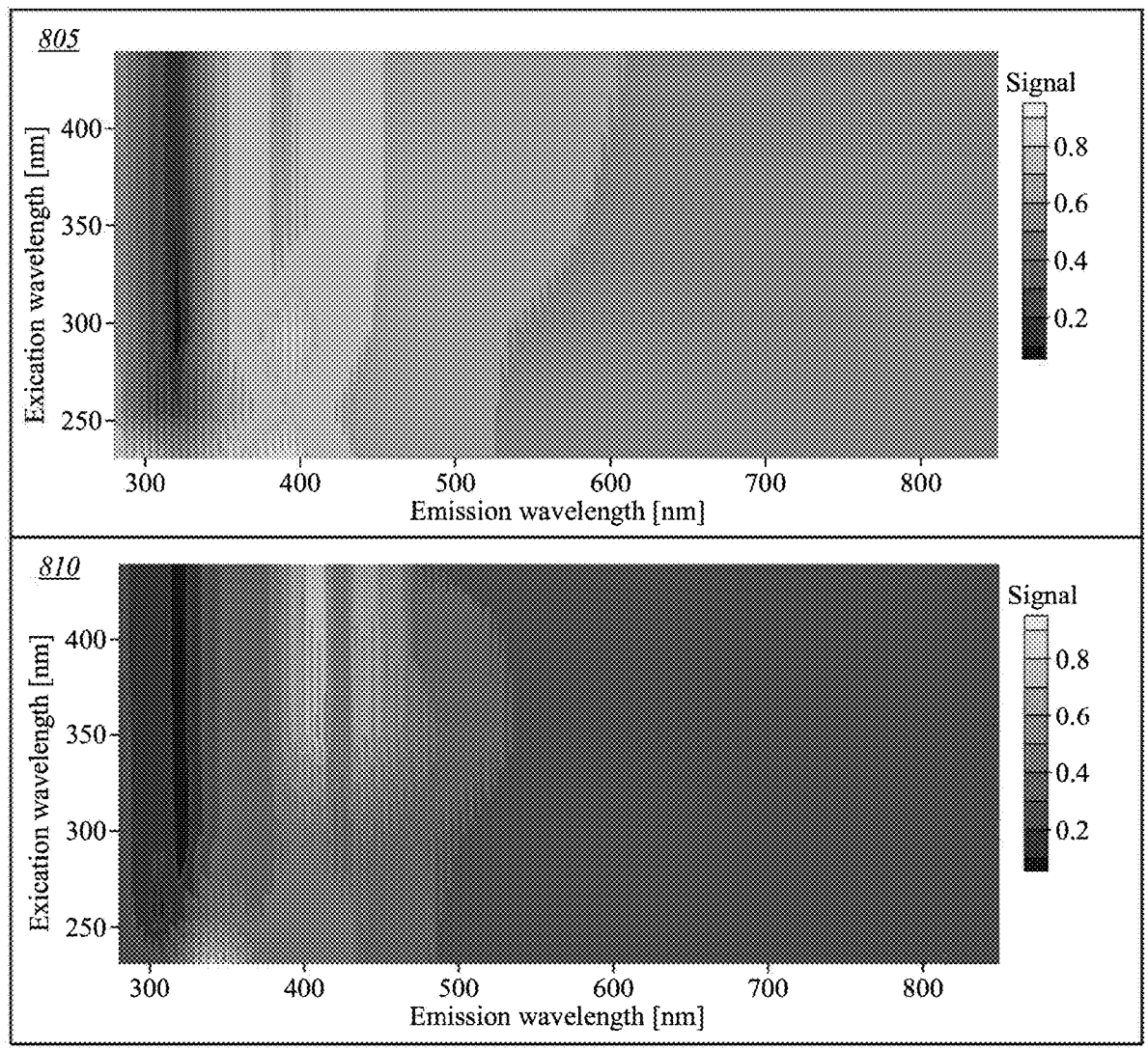

FIG. 7 depicts illustrative 2D fluorescent plots in accordance with the present disclosure. Plot 705 is of a typical low transporter and plot 710 is for a typical high transporter. In some embodiments, plots 705 and 710 may be used as training data for computational models according to various embodiments, for instance, as training plots for AI/ML recognition. FIG. 8 depicts illustrative 2D fluorescent plots in accordance with the present disclosure. Plot 805 is of a (likely) typical low transporter and plot 810 is for a (likely) typical high transporter. In some embodiments, plots 705, 710, 805, and/or 810 may be fluorescent plots of spent dialysate or PD effluent.

Dialysis profile processes may use computational models, and associated AI/ML algorithms built based on a training database consist of 2D fluorescence spectrum of samples with known patient status, such as transporters status, disease progression, dialysis efficiency/effectiveness, and/or the like classified by conventional methods, such as a PET test. Measurements obtained in patient samples may be tested against the patient profiles (for example, via a computational model) to identify the transporter status.

Figure 9A:
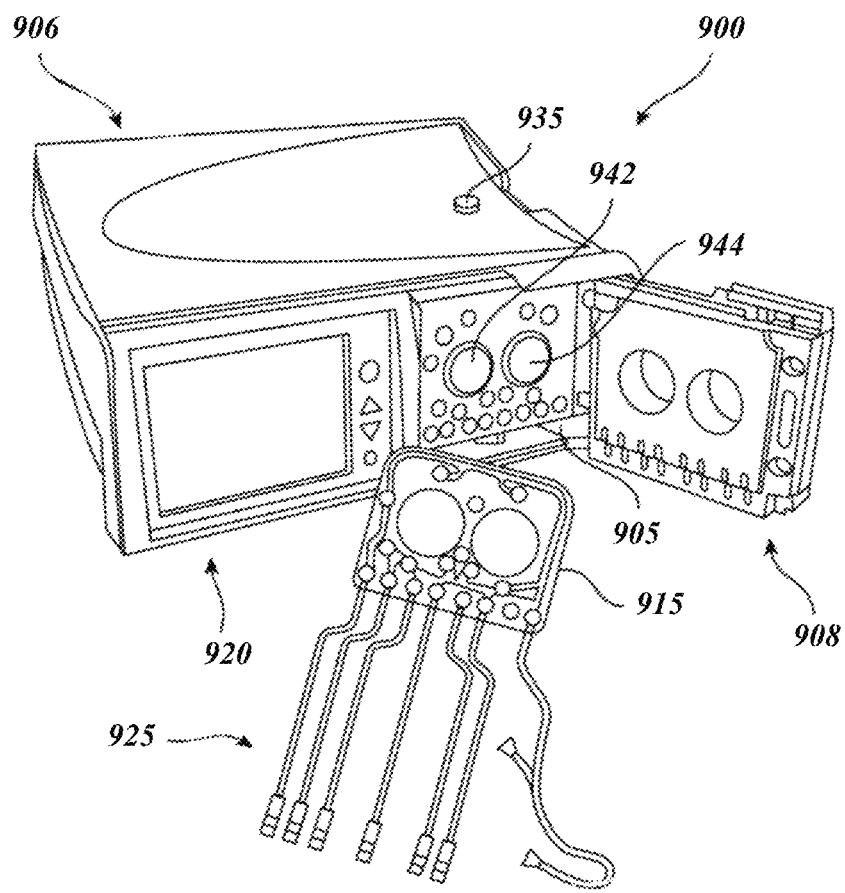
FIGS. 9A and 9B illustrate an exemplary dialysis system according to some embodiments.
Figure 9B:
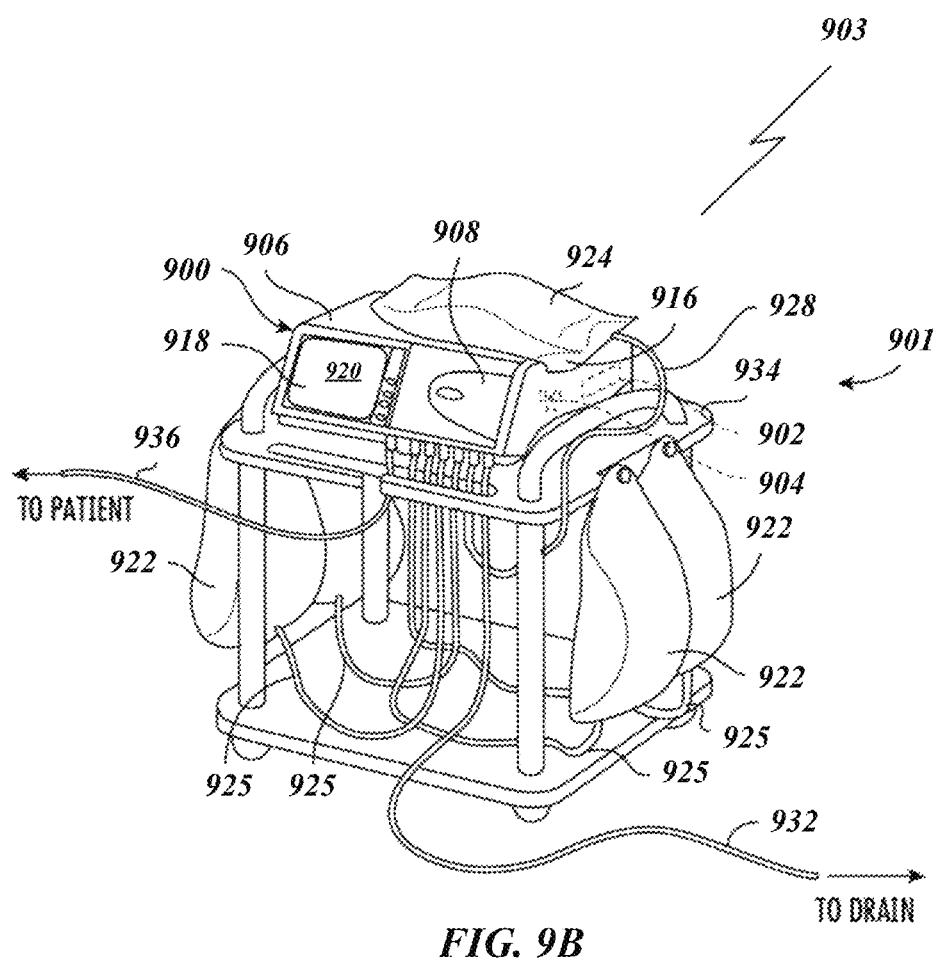

FIGS. 9A-9B show an example of a peritoneal dialysis (PD) system 901, which is configured in accordance with an exemplary embodiment of the system described herein. In some implementations, the PD system 901 may be a home PD system, e.g., a PD system configured for use at a patient's home. The dialysis system 901 may include a dialysis machine 900 (e.g., a peritoneal dialysis machine 900, also referred to as a PD cycler) and in some embodiments the machine may be seated on a cart 934.

The dialysis machine 900 may include a housing 906, a door 908, and a cartridge interface including pump heads 942, 944 for contacting a disposable cassette, or cartridge 915, where the cartridge 915 is located within a compartment formed between the cartridge interface and the closed door 908 (e.g., cavity 905). Fluid lines 925 may be coupled to the cartridge 915 in a known manner, such as via a connector, and may further include valves for controlling fluid flow to and from fluid bags including fresh dialysate and warming fluid. In another embodiment, at least a portion of the fluid lines 925 may be integral to the cartridge 915. Prior to operation, a user may open the door 908 to insert a fresh cartridge 915, and to remove the used cartridge 915 after operation.

The cartridge 915 may be placed in the cavity 905 of the machine 900 for operation. During operation, dialysate fluid may be flowed into a patient's abdomen via the cartridge 915, and spent dialysate, waste, and/or excess fluid may be removed from the patient's abdomen via the cartridge 915. The door 908 may be securely closed to the machine 900. Peritoneal dialysis for a patient may include a total treatment of approximately 10 to 30 liters of fluid, where approximately 2 liters of dialysate fluid are pumped into a patient's abdomen, held for a period of time, e.g., about an hour, and then pumped out of the patient. This is repeated until the full treatment volume is achieved, and usually occurs overnight while a patient sleeps.

A heater tray 916 may be positioned on top of the housing 906. The heater tray 916 may be any size and shape to accommodate a bag of dialysate (e.g., a 5 L bag of dialysate) for batch heating. The dialysis machine 900 may also include a user interface such as a touch screen 918 and control panel 920 operable by a user (e.g., a caregiver or a patient) to allow, for example, set up, initiation, and/or termination of a dialysis treatment. In some embodiments, the heater tray 916 may include a heating element 935, for heating the dialysate prior to delivery into the patient.

Dialysate bags 922 may be suspended from hooks on the sides of the cart 934, and a heater bag 924 may be positioned in the heater tray 916. Hanging the dialysate bags 922 may improve air management as air content may be disposed by gravity to a top portion of the dialysate bag 922. Although four dialysate bags 922 are illustrated in FIG. 9B, any number "n" of dialysate bags may be connectable to the dialysis machine 900 (e.g., 1 to 5 bags, or more), and reference made to first and second bags is not limiting to the total number of bags used in a dialysis system 901. For example, the dialysis machine may have dialysate bags 922a, . . . 922n connectable in the system 901. In some embodiments, connectors and tubing ports may connect the dialysate bags 922 and lines for transferring dialysate. Dialysate from the dialysate bags 922 may be transferred to the heater bag 924 in batches. For example, a batch of dialysate may be transferred from the dialysate bags 922 to the heater bag 924, where the dialysate is heated by the heating element 935. When the batch of dialysate has reached a predetermined temperature (e.g., approximately 98°-100° F., 37° C.), the batch of dialysate may be flowed into the patient. The dialysate bags 922 and the heater bag 924 may be connected to the cartridge 915 via dialysate bag lines or tubing 925 and a heater bag line or tubing 928, respectively. The dialysate bag lines 925 may be used to pass dialysate from dialysate bags 922 to the cartridge during use, and the heater bag line 928 may be used to pass dialysate back and forth between the cartridge and the heater bag 924 during use. In addition, a patient line 936 and a drain line 932 may be connected to the cartridge 915. The patient line 936 may be connected to a patient's abdomen via a catheter and may be used to pass dialysate back and forth between the cartridge and the patient's peritoneal cavity by the pump heads 942, 944 during use. The drain line 932 may be connected to a drain or drain receptacle and may be used to pass dialysate from the cartridge to the drain or drain receptacle during use.

Although in some embodiments, dialysate may be batch heated as described above, in other embodiments, dialysis machines may heat dialysate by in-line heating, e.g., continuously flowing dialysate through a warmer pouch positioned between heating elements prior to delivery into a patient. For example, instead of a heater bag for batch heating being positioned on a heater tray, one or more heating elements may be disposed internal to the dialysis machine. A warmer pouch may be insertable into the dialysis machine via an opening. It is also understood that the warmer pouch may be connectable to the dialysis machine via tubing (e.g., tubing 925), or fluid lines, via a cartridge. The tubing may be connectable so that dialysate may flow from the dialysate bags, through the warmer pouch for heating, and to the patient.

In such in-line heating embodiments, a warmer pouch may be configured so dialysate may continually flow through the warmer pouch (instead of transferred in batches for batch heating) to achieve a predetermined temperature before flowing into the patient. For example, in some embodiments the dialysate may continually flow through the warmer pouch at a rate between approximately 100-300 mL/min. Internal heating elements (not shown) may be positioned above and/or below the opening, so that when the warmer pouch is inserted into the opening, the one or more heating elements may affect the temperature of dialysate flowing through the warmer pouch. In some embodiments, the internal warmer pouch may instead be a portion of tubing in the system that is passed by, around, or otherwise configured with respect to, a heating element(s).

The touch screen 918 and the control panel 920 may allow an operator to input various treatment parameters to the dialysis machine 900 and to otherwise control the dialysis machine 900. In addition, the touch screen 918 may serve as a display. The touch screen 918 may function to provide information to the patient and the operator of the dialysis system 901. For example, the touch screen 918 may display information related to a dialysis treatment to be applied to the patient, including information related to a prescription.

The dialysis machine 900 may include a processing module 902 that resides inside the dialysis machine 900, the processing module 902 being configured to communicate with the touch screen 918 and the control panel 920. The processing module 902 may be configured to receive data from the touch screen 918 the control panel 920 and sensors, e.g., weight, air, flow, temperature, and/or pressure sensors, and control the dialysis machine 900 based on the received data. For example, the processing module 902 may adjust the operating parameters of the dialysis machine 900.

The dialysis machine 900 may be configured to connect to a network 903. The connection to network 903 may be via a wired and/or wireless connection. The dialysis machine 900 may include a connection component 904 configured to facilitate the connection to the network 903. The connection component 904 may be a transceiver for wireless connections and/or other signal processor for processing signals transmitted and received over a wired connection. Other medical devices (e.g., other dialysis machines) or components may be configured to connect to the network 903 and communicate with the dialysis machine 900.

The user interface portion such as the touch screen 918 and/or control panel 920 may include one or more buttons for selecting and/or entering user information. The touch screen 918 and/or control panel 920 may be operatively connected to a controller (not shown) and disposed in the machine 900 for receiving and processing the inputs to operate the dialysis machine 900.

Figure 10:
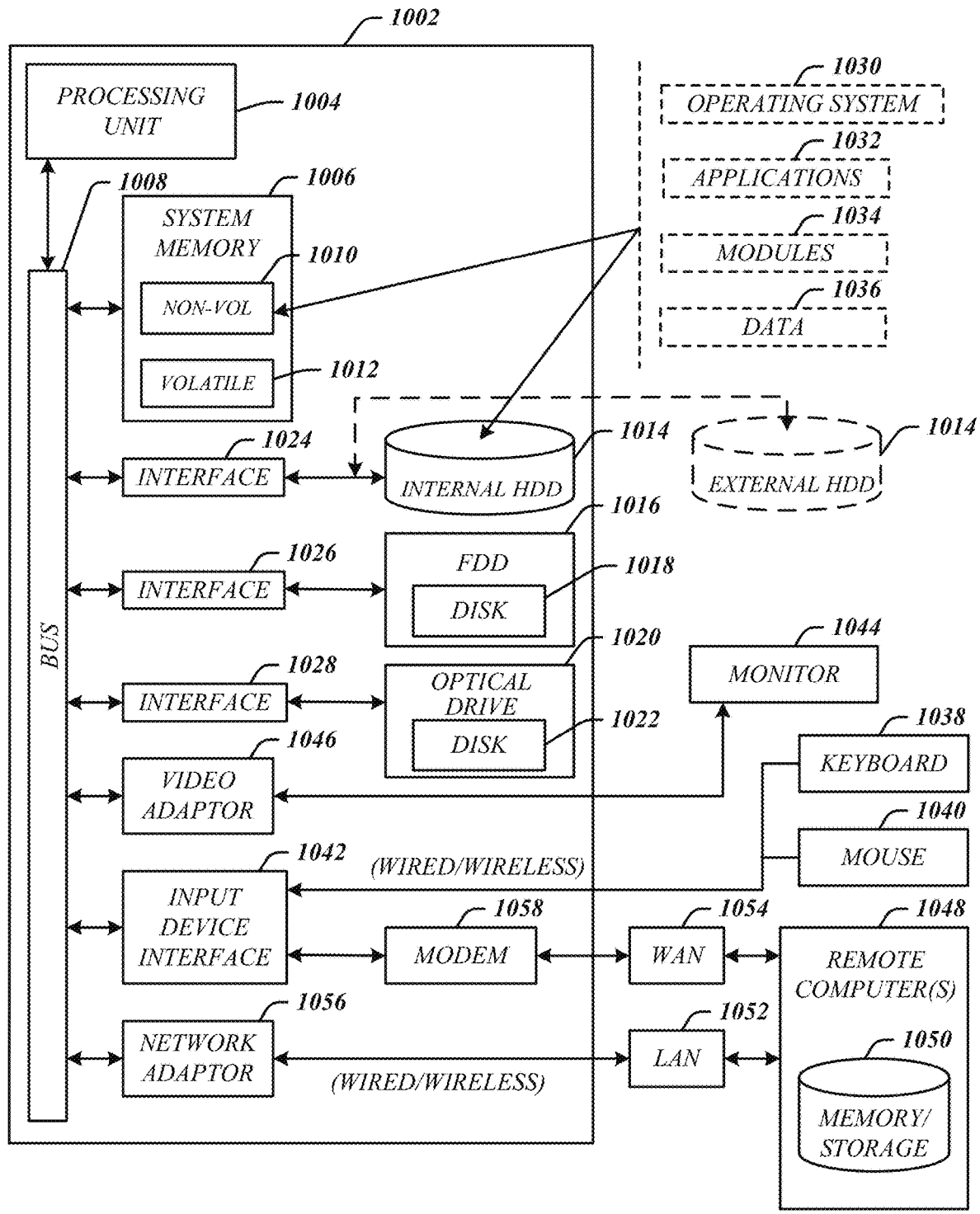
FIG. 10 illustrates an embodiment of a computing architecture in accordance with the present disclosure.

FIG. 10 illustrates an embodiment of an exemplary computing architecture 1000 suitable for implementing various embodiments as previously described. In various embodiments, the computing architecture 1000 may comprise or be implemented as part of an electronic device. In some embodiments, the computing architecture 1000 may be representative, for example, of computing device 1002 and/or components thereof. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1000 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1000.

As shown in FIG. 10, the computing architecture 1000 comprises a processing unit 1004, a system memory 1006 and a system bus 1008. The processing unit 1004 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1004.

The system bus 1008 provides an interface for system components including, but not limited to, the system memory 1006 to the processing unit 1004. The system bus 1008 can be any of several types of bus structure that may further interconnect to a memory bus (with or without a memory controller), a peripheral bus, and a local bus using any of a variety of commercially available bus architectures. Interface adapters may connect to the system bus 1008 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 1006 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 10, the system memory 1006 can include non-volatile memory 1010 and/or volatile memory 1012. A basic input/output system (BIOS) can be stored in the non-volatile memory 1010.

The computer 1002 may include various types of computer-readable storage media in the form of one or more lower speed memory units, including an internal (or external) hard disk drive (HDD) 1014, a magnetic floppy disk drive (FDD) 1016 to read from or write to a removable magnetic disk 1018, and an optical disk drive 1020 to read from or write to a removable optical disk 1022 (e.g., a CD-ROM or DVD). The HDD 1014, FDD 1016 and optical disk drive 1020 can be connected to the system bus 1008 by a HDD interface 1024, an FDD interface 1026 and an optical drive interface 1029, respectively. The HDD interface 1024 for external drive implementations can include at least one or both of Universal Serial Bus (USB) and IEEE 1384 interface technologies.

The drives and associated computer-readable media provide volatile and/or nonvolatile storage of data, data structures, computer-executable instructions, and so forth. For example, a number of program modules can be stored in the drives and memory units 1010, 1012, including an operating system 1030, one or more application programs 1032, other program modules 1034, and program data 1036. In one embodiment, the one or more application programs 1032, other program modules 1034, and program data 1036 can include, for example, the various applications and/or components of computing device 110.

A user can enter commands and information into the computer 1002 through one or more wire/wireless input devices, for example, a keyboard 1038 and a pointing device, such as a mouse 1040. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1004 through an input device interface 1042 that is coupled to the system bus 1008, but can be connected by other interfaces such as a parallel port, IEEE 994 serial port, a game port, a USB port, an IR interface, and so forth.

A monitor 1044 or other type of display device is also connected to the system bus 1008 via an interface, such as a video adaptor 1046. The monitor 1044 may be internal or external to the computer 1002. In addition to the monitor 1044, a computer typically includes other peripheral output devices, such as speakers, printers, and so forth.

The computer 1002 may operate in a networked environment using logical connections via wire and/or wireless communications to one or more remote computers, such as a remote computer 1049. The remote computer 1049 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the LAN 1052 through a wire and/or wireless communication network interface or adaptor 1056. The adaptor 1056 can facilitate wire and/or wireless communications to the LAN 1052, which may also include a wireless access point disposed thereon for communicating with the wireless functionality of the adaptor 1056.

When used in a WAN networking environment, the computer 1002 can include a modem 1058, or is connected to a communications server on the WAN 1054, or has other means for establishing communications over the WAN 1054, such as by way of the Internet. The modem 1059, which can be internal or external and a wire and/or wireless device, connects to the system bus 1008 via the input device interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, an element or operation recited in the singular and proceeded with the word "a" or "an" should be understood as not excluding plural elements or operations, unless such exclusion is explicitly recited. Furthermore, references to "one embodiment" of the present disclosure are not intended to be interpreted as excluding the existence of additional embodiments that also incorporate the recited features.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of determining a patient profile of a peritoneal dialysis patient, the method comprising:
    obtaining a volume of fluid associated with the peritoneal dialysis patient;
    generating patient information via fluorescence analysis of the patient fluid; and
    determining the patient profile based on evaluating the patient information with a profile library, wherein the profile library comprises peritoneal equilibration test (PET) information and the patient profile comprises a peritoneal transport status classification;
    wherein fluorescence analysis includes:
        capturing two-dimensional (2D) fluorescence measurements comprising systematically scanning an excitation wavelength of the patient fluid while a corresponding emission spectra of the patient fluid is captured; and
        generating, based on the 2D fluorescence measurements, a 2D correlation map enabling identification of multiple fluorophores in the patient fluid.

2. The method of claim 1, the volume obtained during routine dialysis of a patient.

3. The method of claim 1, the fluorescence analysis comprising fluorescence spectroscopy.

4. The method of claim 1, the fluorescence analysis performed via an in-line fluorescence device, the in-line fluorescence device positioned in-line at an interface that connects to an abdominal catheter of the peritoneal dialysis patient.

5. The method of claim 1, the fluid comprising fresh dialysate of a peritoneal dialysis (PD) treatment, the fresh dialysate being unused dialysate before it has entered a peritoneal cavity of the peritoneal dialysis patient.

6. The method of claim 1, the fluid comprising PD effluent of a PD treatment.

7. The method of claim 1, the patient information generated based on a fluorescent plot.

8. The method of claim 1, further comprising generating the patient profile via a machine learning computational model configured to provide the patient profile as output based on the patient information as input.

9. The method of claim 1, further comprising training a computational model using at least a portion of the profile library to generate patient profile output based on patient information input.

10. The method of claim 1, further comprising training a computational model using the profile library comprising the PET information and associated fluorescent plots of known health conditions of a population of patients.

11. The method of claim 1, further comprising determining a dialysis prescription based on the patient profile.

12. The method of claim 1, further comprising performing a dialysis treatment on the patient based on the patient profile.

13. The method of claim 1, wherein the peritoneal transport status classification is selected from high, high-average, average, low-average, or low transporter status.

14. An apparatus, comprising:
    processor circuitry; and
    a memory coupled to the processor circuitry, the memory comprising instructions that, when executed by the processor circuitry, cause the processor circuitry to:
        generate patient information via fluorescence analysis of a patient fluid of a dialysis patient; and
        determine a patient profile of the dialysis patient based on evaluating the patient information with a profile library, wherein the profile library comprises peritoneal equilibration test (PET) information and the patient profile comprises a peritoneal transport status classification, wherein the patient profile is generated via a machine learning computational model configured to provide the patient profile as output based on the patient information as input;
    wherein fluorescence analysis includes the processor circuitry being caused to:
        capture two-dimensional (2D) fluorescence measurements comprising systematically scanning an excitation wavelength of the patient fluid while a corresponding emission spectra of the patient fluid is captured; and
        generate, based on the 2D fluorescence measurements, a 2D correlation map enabling identification of multiple fluorophores in the patient fluid.

15. The apparatus of claim 14, the fluorescence analysis comprising fluorescence spectroscopy.

16. The apparatus of claim 14, the fluorescence analysis performed via an in-line fluorescence device, the in-line fluorescence device positioned in-line at an interface that connects to an abdominal catheter of the peritoneal dialysis patient.

17. The apparatus of claim 14, the fluid comprising PD effluent of a PD treatment, the fresh dialysate being unused dialysate before it has entered a peritoneal cavity of the peritoneal dialysis patient.

18. The apparatus of claim 14, the patient information generated based on a fluorescent plot.

19. The apparatus of claim 14, the instructions, when executed by the processor circuitry, to cause the processor circuitry to train a computational model using the profile library comprising the PET information and associated fluorescent plots of known peritoneal transport status of a population of patients.

20. The apparatus of claim 14, wherein the peritoneal transport status classification is selected from high, high-average, average, low-average, or low transporter status.

* * * * *

UNITED STATES PATENT AND TRADEMARK OFFICE
CERTIFICATE OF CORRECTION

| | | |
|---|---|---|
| PATENT NO. | : 12,472,291 B2 | Page 1 of 1 |
| APPLICATION NO. | : 17/587168 | |
| DATED | : November 18, 2025 | |
| INVENTOR(S) | : Peter Kotanko et al. | |

It is certified that error appears in the above-identified patent and that said Letters Patent is hereby corrected as shown below:

On the Title Page

At (72) Inventor: Please correct to read --Peter Kotanko, New York, NY (US); Xia Tao, West New York, NJ (US); Nadja Grobe, Huntington, NY (US); Gabriela Ferreira Dias, Waltham, MA (US); Zahin Haq, Waltham, MA (US); Stephan Thijssen, New York, NY (US)--.

Signed and Sealed this
Twenty-third Day of December, 2025

John A. Squires
*Director of the United States Patent and Trademark Office*